J. P. WHITE.
FILTER.
APPLICATION FILED MAY 29, 1908.
904,389.
Patented Nov. 17, 1908.
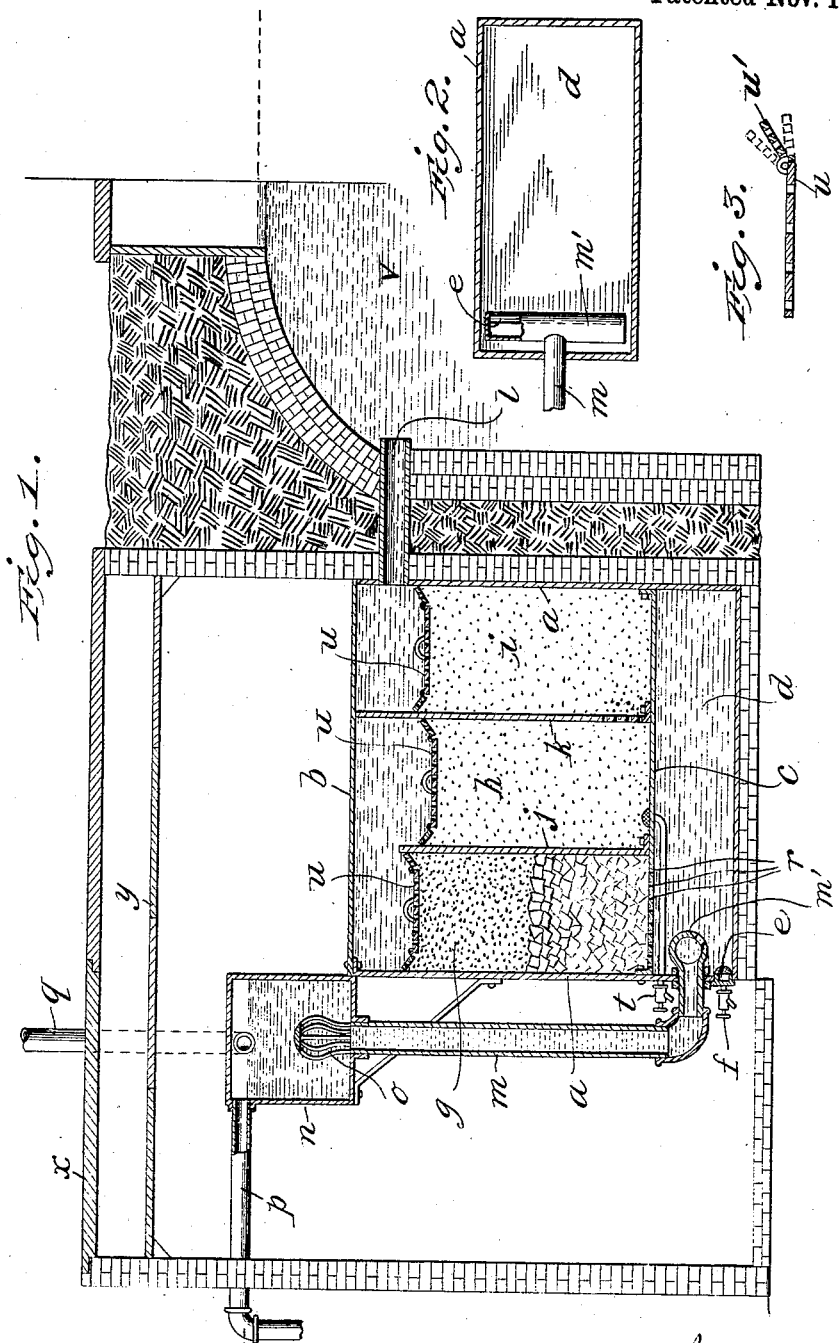
Witnesses
Jno. J. Smith
Edwin L. Jewell
Inventor
John P. White
By Davis & Davis
Attorneys

UNITED STATES PATENT OFFICE.

JOHN P. WHITE, OF FREMONT, OHIO.

FILTER.

No. 904,389.  Specification of Letters Patent.  Patented Nov. 17, 1908.

Application filed May 29, 1908. Serial No. 435,713.

*To all whom it may concern:*

Be it known that I, JOHN P. WHITE, a citizen of the United States of America, and a resident of Fremont, county of Sandusky, State of Ohio, have invented certain new and useful Improvements in Filters, of which the following is a full and clear specification.

The object of this invention is to provide an inexpensive, durable, and efficient water filter, and to the accomplishment of this object and such others as may hereinafter appear, the invention consists of the parts and combination of parts hereinafter fully described, and particularly pointed out in the appended claims, reference being had to the accompanying drawings forming a part of this specification, in which the same reference characters designate like parts throughout the several views. I attain this object by the mechanism illustrated in the accompanying drawings, in which Figure 1 is a vertical longitudinal sectional view of my improved filter showing the manner of constructing and arranging it with reference to a cistern or reservoir; Fig. 2 is a horizontal sectional view of the filter casing taken through the sediment chamber; and, Fig. 3 is a detail vertical sectional view of a portion of one of the compacting perforated weights.

Referring to the drawing by reference characters, $a$ designates the main casing which is preferably made of metal and is preferably rectangular in shape and is covered by a removable cover $b$ and is divided horizontally by a partition $c$ secured near the bottom of the casing and forming a sediment chamber $d$, this sediment chamber being provided with a cleanout opening $e$ in whose plug is inserted a suitable drain-cock $f$. The chamber above the sediment chamber is divided vertically into three compartments $g$, $h$, and $i$, by two vertical partitions lettered, respectively, $j$ and $k$, the partition $j$ terminating below the top of the casing and approximately on a level with the outlet $l$ and the other partition extending up to the cover.

The inlet pipe $m$ is connected to the sediment chamber at one end thereof and its upper end is connected to a receiving chamber $n$, a suitable strainer $o$ being placed over the inlet of this pipe $m$. Connected to this chamber $n$ is an overflow pipe $p$ and also a supply pipe $q$. These pipes and the receiving chamber may be of any suitable dimensions and capacity.

The bottom of the chamber $g$ is perforated at $r$ and this chamber is filled with a suitable coarse filtering material, preferably a lower body of charcoal and an upper body of crushed sand-stone. The chambers $h$ and $i$ are also filled with a suitable granular filtering material such as sand, and leading from the bottom of the chamber $h$ is a suitable drain-cock $t$. The filtering material in each of these chambers is held in place by a suitable gravitatingly supported weight or plate $u$ resting directly on top of the filtering material and loosely fitting the chamber, the marginal sections $u'$ of each weight being hinged. At its lower end the partition $k$ is perforated to put the two chambers $h$ and $i$ into communication at their lower extremities.

It will be observed that the incoming water will pass from the sediment chamber up through chamber $g$, and thence down through chamber $h$, and thence up through chamber $i$ and out at the outlet to the cistern or other storage tank $v$. The filter shown is especially adapted for a gravity filter but it will be observed that it is equally adapted for use with a pressure system and when used with a pressure system the supply chamber and overflow connections will be rendered unnecessary as the water from the main may be discharged directly into the sediment chamber.

It will be observed that the strainer $o$ will remove such large objects as leaves and twigs while the sediment chamber will catch the finer but heavier foreign objects and thus prevent clogging up of the perforated plates and the filtering media. By requiring that the partially screened water shall pass circuitously in the manner described through the several filtering chambers the water will be thoroughly filtered by the time it reaches the outlet.

It will be observed that by draining the sediment chamber all the water may be drained out of the chamber $g$ and pipe $m$ at the same time, while by opening cock $t$ the two remaining filtering chambers may be drained. The filtering materials may be readily removed by simply removing the top of the casing and the loosely supported perforated plates.

The advantage in gravitatingly supporting the perforated plates directly on the filtering bodies is that they will settle with the filtering body and thus maintain the filtering body in compact condition leaving no unfilled spaces in the filtering body, so that every particle of the water will be required to pass through the compact masses of filtering materials. This is a very important advantage as where the filtering body is not thus automatically compacted it becomes somewhat honeycombed by the constant passing of water through it in one direction and the water in taking the least obstructed path through the filtering body gets through frequently without a thorough filtration. By hinging the marginal flanges of these weight plates it will be observed that the plates will have a certain amount of self-adjustability and thus will be permitted to slant in one direction or the other, according as the porous material may shift, without binding against the chamber walls or uncovering any portions of the upper surface of the granular material.

A feature of importance lies in connecting the overflow outlet to the receiving chamber since with this arrangement the overflow water is not filtered but is discharged before passing through the filter thus relieving the filter of much useless work. As will be observed, the receiving chamber and the overflow pipe lie above the filter and the overflow pipe is in horizontal alinement with the water-level in the cistern, whereby the filter and the receiving chamber will be filled when the cistern is filled to the desired point, after which the surplus water will pass out through the overflow pipe to the sewer or elsewhere unfiltered.

It will be observed that by connecting the inlet pipe to the filter to the outlet end of the sediment chamber, the larger portion of this chamber is converted into a still-water settling chamber which will insure the deposit of the heavy matters in the water before the water enters the filtering chambers. It will be observed that the inlet end of the inlet pipe extends in through the wall of the sediment chamber and is connected to a transverse pipe $m'$ extending practically entirely across the sediment chamber and closed at its ends and provided with an opening or slot along its under side, whereby the incoming water will be directed downwardly away from the uptake chamber G and thus tend to prevent the heavier matters from being carried up into the filtering chambers. The capacity of the slot or opening is such as to prevent back pressure in the inlet pipe and to permit the incoming water to flow into the sediment chamber in a broad quietly-moving stream which upon striking the bottom of the sediment chamber will move gently toward the still-water end of the chamber and thus deposit the heavy matters toward the back end of the sediment chamber away from the perforations $r$. To facilitate the deposit of the heavy matters toward the back end of the sediment chamber the discharge opening in pipe $m'$ is directed rearwardly and downwardly at an angle of approximately forty-five degrees as shown.

I prefer locating the filter in a suitable masonry structure in the ground or in the cellar adjacent the cistern and to provide a suitable manhole $x$ for gaining access thereto and also a suitable false removable cover $y$ to support any shavings or other non-conducting material that may be packed into the structure to prevent the water in the filter freezing.

Having thus fully described my invention, what I claim as new, and desire to secure by Letters Patent, is:—

1. In a filter, a filtering chamber filled with loose granular material, and a perforated weight gravitatingly supported directly on top of said material and provided with hinged marginal sections whose edges engage the side walls of the chamber.

2. In a filter, the combination of a casing, a sediment chamber formed in the bottom of the casing and extending its full length, the top wall of said sediment chamber being perforated near the front wall of the casing, a series of filtering chambers above the sediment chamber, each chamber being provided with packing means which leaves a clear water space above each body of filtering material, the last one of said chambers being provided with an outlet at its upper end above said packing means, an inlet pipe connected to the sediment chamber at the end thereof adjacent to said perforations, a receiving chamber attached to the upper end of the inlet pipe and provided with a supply pipe and an overflow pipe, substantially as described.

3. In a filter of the class set forth, the combination of a casing having a horizontal partition near its bottom, thus forming a sediment chamber the full length of the casing, said partition being numerously perforated at one end of the casing, filtering means above said partition and an outlet above said partition, an inlet pipe emptying into said chamber at the end thereof adjacent to and below the perforations in the partition, the inlet end of said inlet pipe being provided with a transversely extending pipe slotted in its under side, for the purpose set forth.

4. In combination, a filter having an outlet at one side and an inlet pipe at its other side, a cistern connected with the outlet and having its water-level above the filter, a receiving chamber connected to the upper end of the inlet pipe at a point below the water-level of the cistern, a supply pipe connected to the receiving chamber, and an overflow pipe connected to the receiving chamber at a point in line with the water-level of the cistern, for the purpose set forth.

5. In a filter of the class set forth, the combination of a casing having a horizontal partition near its bottom, thus forming a sediment chamber the full length of the casing, said partition being numerously perforated at one end of the casing, filtering means above said partition and an outlet above said partition, an inlet pipe emptying into said chamber at the end thereof adjacent to and below the perforations in the partition, the discharge opening in said inlet-pipe being directed rearwardly and downwardly, for the purpose set forth.

In testimony whereof I hereunto affix my signature in the presence of two witnesses this 26th day of May 1908.

JOHN P. WHITE.

Witnesses:
  HARRY PRICE,
  BASIL MEEK.